United States Patent
Sun

(10) Patent No.: US 11,539,226 B2
(45) Date of Patent: Dec. 27, 2022

(54) CHARGING CIRCUIT AND ELECTRONIC DEVICE

(71) Applicant: Beijing Xiaomi Mobile Software Co., Ltd., Beijing (CN)

(72) Inventor: Changyu Sun, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 165 days.

(21) Appl. No.: 16/864,427

(22) Filed: May 1, 2020

(65) Prior Publication Data

US 2021/0184472 A1 Jun. 17, 2021

(30) Foreign Application Priority Data

Dec. 13, 2019 (CN) .......................... 201911281051.5

(51) Int. Cl.
 *H02J 7/00* (2006.01)
 *H01M 10/44* (2006.01)
 *H01M 10/42* (2006.01)
 (Continued)

(52) U.S. Cl.
 CPC ........... *H02J 7/007* (2013.01); *H01M 10/425* (2013.01); *H01M 10/441* (2013.01); *H01M 50/20* (2021.01); *H02J 7/0025* (2020.01)

(58) Field of Classification Search
 CPC ........... H02J 7/007; H02J 7/0025; H02J 7/00; H01M 2/1077; H01M 2/10; H01M 10/425;
 (Continued)

(56) References Cited

U.S. PATENT DOCUMENTS 5,757,163 A * 5/1998 Brotto .................... H02J 7/0024
 320/155
6,271,643 B1 * 8/2001 Becker .................. H02J 7/0072
 320/112
(Continued)

FOREIGN PATENT DOCUMENTS

CN 1215240 A 4/1999
JP H 09271145 A 10/1997
(Continued)

OTHER PUBLICATIONS

Supplementary European Search Report in the European application No. 20174389.5, dated Jul. 29, 2020.
(Continued)

*Primary Examiner* — Drew A Dunn
*Assistant Examiner* — Dung V Bui
(74) *Attorney, Agent, or Firm* — Finnegan, Henderson, Farabow, Garrett & Dunner, L.L.P.

(57) ABSTRACT

A charging circuit includes: an interface; a plurality of charging management components connected to the interface in parallel; and a plurality of battery packs, wherein each of the plurality of battery packs includes a battery or a plurality of batteries connected in series with each other, the plurality of battery packs are connected in series with the plurality of charging management components, respectively, and the plurality of battery packs are connected in parallel; wherein the plurality of charging management components are electrically connected with each other to adjust, through signal interaction between the plurality of charging management components, a charging current that is input to each of the battery packs, such that a time period of a maximum charging current for each battery pack is different from a time period of a maximum charging current for another battery pack.

18 Claims, 6 Drawing Sheets

(51) Int. Cl.
*H01M 2/10* (2006.01)
*H01M 50/20* (2021.01)

(58) Field of Classification Search
CPC .... H01M 10/441; H01M 10/44; H01M 10/42; H01M 50/20
USPC ......................................................... 320/112
See application file for complete search history.

(56) References Cited

U.S. PATENT DOCUMENTS

| | | | |
|---|---|---|---|
| 7,800,343 B2* | 9/2010 | Aradachi | G01R 31/392 324/426 |
| 2003/0006734 A1 | 1/2003 | You | |
| 2005/0083014 A1* | 4/2005 | Baumgartner | H02J 7/00041 320/116 |
| 2005/0275374 A1* | 12/2005 | Guang | H02J 7/00038 320/116 |
| 2008/0252261 A1* | 10/2008 | Seo | H02J 7/0013 320/139 |
| 2010/0138177 A1* | 6/2010 | Yu | G01R 31/367 702/63 |
| 2011/0121783 A1* | 5/2011 | Boyles | H02J 7/0045 320/113 |
| 2018/0031642 A1 | 2/2018 | Sung | |
| 2019/0126761 A1* | 5/2019 | Verbridge | H01M 10/441 |

FOREIGN PATENT DOCUMENTS

| | | | |
|---|---|---|---|
| JP | H 1197074 A | | 4/1999 |
| JP | 2010011708 A | * | 1/2010 |
| JP | 2013102625 A | | 5/2013 |
| JP | 2013115953 A | | 6/2013 |
| JP | 2013172539 A | | 9/2013 |
| WO | WO 2019049571 A1 | | 3/2019 |

OTHER PUBLICATIONS

First Office Action of Japanese Application No. 2020-087784, dated Jul. 13, 2021.

* cited by examiner

CHARGING CIRCUIT AND ELECTRONIC DEVICE

CROSS-REFERENCE TO RELATED APPLICATION

This application is based upon and claims priority to Chinese Patent Application No. 201911281051.5 filed on Dec. 13, 2019, the content of which is hereby incorporated by reference in its entirety.

TECHNICAL FIELD

The disclosure relates to the technical field of terminals, and more particularly, to a charging circuit and an electronic device.

BACKGROUND

As functions of intelligent terminals become more and more powerful, power consumption may increase accordingly. Therefore, in order to meet the power consumption demand of the intelligent terminals and extend the endurance of the intelligent terminals, a plurality of batteries have been arranged in some intelligent terminals to increase the battery capacity. However, increasing the number of batteries brings new challenges to the charging mode and charging efficiency.

SUMMARY

According to the first aspect of the embodiments of the disclosure, a charging circuit may include: an interface; a plurality of charging management components connected to the interface in parallel; and a plurality of battery packs, wherein each of the plurality of battery packs includes a battery or a plurality of batteries connected in series with each other, the plurality of battery packs are connected in series with the plurality of charging management components, respectively, and the plurality of battery packs are connected in parallel, wherein the plurality of charging management components are electrically connected with each other to adjust, through signal interaction between the plurality of charging management components, a charging current that is input to each of the battery packs, such that a time period of a maximum charging current for each of the plurality of battery packs is different from a time period of a maximum charging current for another one of the plurality of battery packs.

According to the second aspect of the embodiments of the disclosure, the disclosure provides an electronic device including the charging circuit according to the first aspect above.

The technical solutions provided by the embodiments of the disclosure have the following beneficial effects:

In the embodiments, through signal interaction between a plurality of charging management components, the method can prevent a plurality of battery packs from being charged at high current at the same time, stagger the maximum charging current for the plurality of battery packs, and thus reduce the requirement on the output power of a charging end. Moreover, since the maximum charging currents for the plurality of battery packs are at different time periods, the plurality of battery packs can be prevented from reaching the maximum heating state at the same time, the maximum thermal power consumption can be lowered, and the thermal stack design can be reduced for the electronic device provided with the charging circuit.

It should be understood that the above general description and the subsequent detailed description are only exemplary and explanatory, and shall not limit the disclosure.

BRIEF DESCRIPTION OF THE DRAWINGS

The accompanying drawings, which are incorporated in and constitute a part of this description, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Terms used in the disclosure are for the purpose of describing exemplary embodiments only and are not intended to limit the disclosure. For example, the terms "first," "second," "third" and so on may be used in the disclosure to describe various information, such information shall not be limited to these terms. These terms are used only to distinguish information of the same type from each other. For example, without departing from the scope of the disclosure, first information may also be referred to as second information. Similarly, second information may also be referred to as first information.

Figure 1:
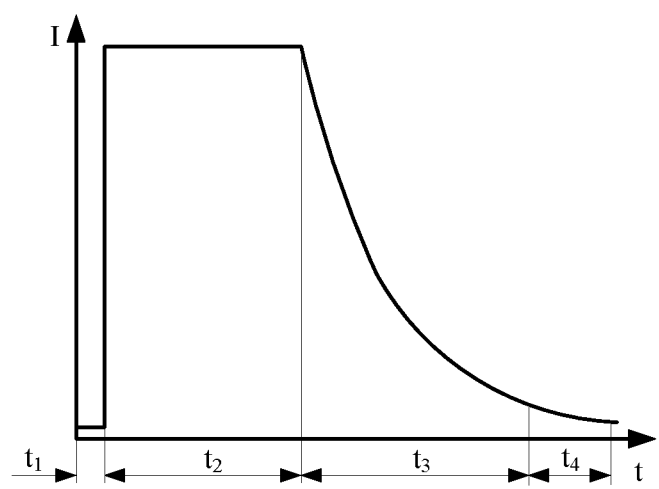
FIG. 1 is a time-current curve diagram of charging a lithium battery in related art.

FIG. 1 is a time-current curve diagram of charging a lithium battery in related art. In FIG. 1, the horizontal coordinate represents time (t) and the longitudinal coordinate represents current (I) values. In time period $t_1$, trickle charging may be performed to the lithium battery, and the current may be small at the trickle charging stage. When the voltage of the lithium battery reaches a threshold, the charging current may be increased, and constant-current charging may be performed to the lithium battery in time period $t_2$, and this stage is the one with the highest charging efficiency. When the voltage of the lithium battery reaches another threshold, the charging current may be reduced, constant-voltage charging may be performed to the lithium battery in time period $t_3$, and finally the process proceeds to the charging termination stage in time period $t_4$.

Figure 2:
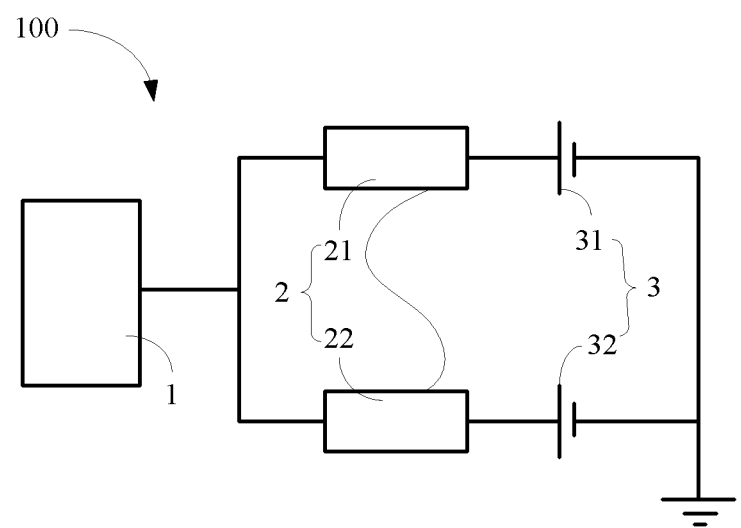
FIG. 2 is a schematic diagram of a charging circuit according to an exemplary embodiment.
Figure 3:
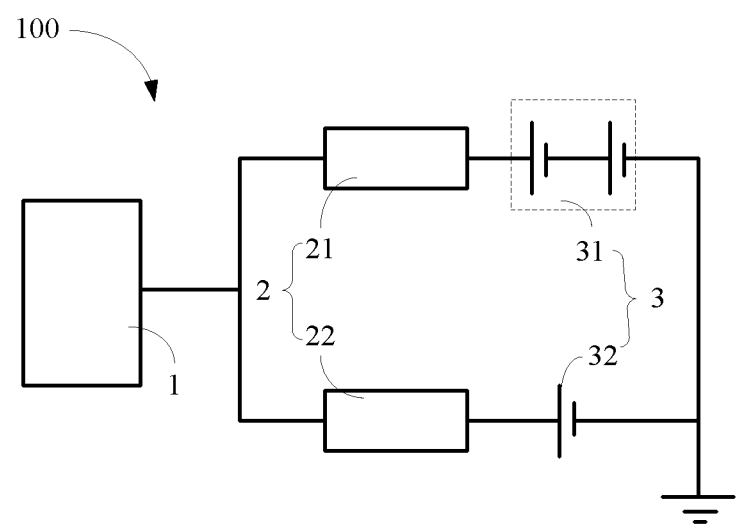
FIG. 3 is a schematic diagram of a charging circuit according to an exemplary embodiment.

FIG. 2 and FIG. 3 are schematic diagrams of a charging circuit 100 according to exemplary embodiments. As illustrated in FIG. 2, the charging circuit 100 may include an interface 1, a plurality of charging management components 2 and a plurality of battery packs 3. Each battery pack 3 may include a battery or a plurality of batteries, e.g., connected in series with each other. The plurality of battery packs 3 and the plurality of charging management components 2 may be connected in series, respectively, and the plurality of battery packs 3 may be connected in parallel. For example, as illustrated in FIG. 2, the plurality of charging management components 2 may include a first charging management component 21 and a second charging management component 22, the plurality of battery packs 3 may include a first battery pack 31 and a second battery pack 32, the first charging management component 21 and the first battery pack 31 may be connected in series, the second charging management component 22 and the second battery pack 32 may be connected in series, and the first battery pack 31 and the second battery 32 may be connected in parallel and may be connected to a grounding point. As illustrated in FIG. 2, each of the first battery pack 31 and the second battery pack 32 may include a single battery, or as illustrated in FIG. 3, the first battery pack 31 may include two batteries connected in series with each other, and the second battery pack 32 may include a single battery. In other embodiments, the first battery pack 31 may include three or more than three batteries, the second battery pack 32 may include a plurality of batteries; or the first battery pack 31 may include a single battery, and the second battery pack 32 may include a plurality of batteries, which are not limited in the disclosure. Moreover, in the embodiments illustrated in FIG. 2 and FIG. 3, description is made by taking that the charging circuit 100 includes the first charging management component 21, the second charging management component 22, the first battery pack 31, and the second battery pack 32 as an example. In other embodiments, three or more than three charging management components and battery packs may be included.

Further, the plurality of charging management components 2 may be electrically connected with each other to adjust, through signal interaction between the plurality of charging management components 2, the charging current that is input to each battery pack, such that a time period of a maximum charging current for the each battery pack is different from a time period of a maximum charging current for other battery packs. For example, as illustrated in FIG. 2 and FIG. 3, through the electric connection between the first charging management component 21 and the second charging management component 22, and through the signal interaction between the first charging management component 21 and the second charging management component 22 (represented by the curved line in FIG. 2), the first battery pack 31 may be charged with a large current and the second battery pack 32 may be charged with a small current in a first period; and the second battery pack 32 may be charged with a large current and the first battery pack 31 may be charged with a small current in the second period, so as to prevent the first battery pack 31 and the second battery 32 from being charged with a large current at the same time, stagger the maximum charging current for the first battery pack 31 and the second battery pack 32, and reduce the requirement on the output power of the charging end. Moreover, since the maximum charging currents for the first battery pack 31 and the second battery pack 32 are in different time periods, the first battery pack 31 and the second battery pack 32 can be prevented from reaching the maximum heating state at the same time, the maximum thermal power consumption can be decreased, and the thermal stack design for the electronic device provided with the charging circuit 100 can be reduced.

In the embodiment, in order to charge a plurality of battery packs 3 in an orderly manner, the charging circuit 100 may include a plurality of charging management components 2, which may include a main management component and an auxiliary management component. The main management component may be electrically connected to the auxiliary management component, and the plurality of battery packs 3 may include a main battery pack connected with the main management component and an auxiliary battery pack connected with the auxiliary management component. The main management component is configured to adjust, according to the voltages of the main battery pack and the auxiliary battery pack, the charging current that is input to the main battery pack and send a charging instruction to the auxiliary management component. The charging instruction may be used to instruct the auxiliary management component to adjust the charging current that is output to the corresponding auxiliary battery pack. The voltage of the auxiliary battery pack may be reported to the main management component by the auxiliary management component, or the voltage of the auxiliary battery pack may be acquired initiatively by the main management component from the auxiliary management component, which are not limited in the disclosure.

For example, as illustrated in FIG. 2 and FIG. 3, the first charging management component 21 may be used as the main management component, the first battery pack 31 may be used as the main battery pack, the second charging management component 22 may be used as the auxiliary management component, and the second battery pack 32 may be used as the auxiliary battery pack. In other embodiments, the first charging management component 21 may be used as the auxiliary management component, the first battery pack 31 may be used as the auxiliary battery pack, the second charging management component 22 may be used as the main management component, and the second battery pack 32 may be used as the main battery pack, which are not limited in the disclosure.

The embodiments of the disclosure will be described in detail below with the first charging management component 21 acting as the main management component, the first battery pack 31 acting as the main battery pack, the second charging management component 22 acting as the auxiliary management component and the second battery pack 32 acting as the auxiliary battery pack as an example.

For illustrative purposes, it is assumed that the charging circuit 100 includes a single main management component and a single auxiliary management component, i.e., the first charging management component 21 acting as the main management component and the second charging management component 22 acting as the auxiliary management component, as illustrated in FIG. 2 and FIG. 3. In a case that the voltages of the first battery pack 31 and the second battery pack 32 are both smaller than a first preset value, the first charging management component 21 may firstly pre-charge the first battery pack 31, and when the first battery pack is switched to a constant-current charging stage, the first charging management component 21 may send a first charging instruction to the second charging management component 22, such that the second charging management component 22 may pre-charge the second battery pack 32 according to the first charging instruction. The first preset value may be 3V. In a case that the voltages of the first battery pack 31 and the second battery pack 32 are both lower than 3V, the remaining power of the first battery pack 31 and the second battery pack 32 can be low. Therefore, the time periods of the maximum charging current of the first battery pack 31 and the second battery pack 32 can be staggered by firstly charging the first battery pack 31 and then charging the second battery pack 32.

Further, with the advancement of the charging process, the voltages of the first battery pack 31 and the second battery pack 32 may gradually increase. The first charging management component 21 may send a second charging instruction to the second charging management component 22 when the first battery pack 31 is switched to a constant-voltage charging stage. The second charging instruction may be used to instruct the second charging management component 22 to charge the second battery pack 32 with a constant current. Further, with the advancement of the charging process, when the first charging management component 21 enters the charging termination stage of the first battery pack 32, the current input to the first battery pack 32 may decrease gradually, at which moment the second charging management component 22 may charge the second battery pack 32 with a constant current or constant voltage according to the charging instruction, until the charging of both the first battery pack 31 and the second battery pack 32 is completed.

It is to be noted that description is made here by taking that the voltage of the second battery pack 32 has reached a threshold for constant-current charging when the first charging management component 21 charges the first battery pack 31 at a constant voltage as an example. In other embodiments, when the first charging management component 21 charges the first battery pack 31 at a constant voltage, if the voltage of the second battery pack 32 does not reach the threshold for constant-current charging, the second charging management component 22 may continue pre-charging the second battery pack 32, and when the voltage of the second battery pack 32 reaches the threshold for constant-current charging, the first charging management component 21 may send the second charging instruction again to the second charging management component 22.

The whole charging process is described here by taking that the remaining power of both the first battery pack 31 and the second battery pack 32 is low as an example. In an embodiment, the first battery pack 31 and the second battery pack 32 may be charged when the remaining power of the first battery pack 31 and the second battery pack 32 is at a medium level. In this case, the first charging management component 21 may determine the charging current for the first battery pack 31 according to the voltage of the first battery pack 31, and send a charging instruction to the second charging management component 22 when the first battery pack 31 enters a next charging stage, such that the second charging management component 22 may charge the second battery pack 32.

In another embodiment, the plurality of charging management components 2 may include a main management component and a plurality of auxiliary management components arranged according to precedence. The main management component may be electrically connected with each auxiliary management component, and the main management component may send a charging instruction to the auxiliary management component with next lower precedence according to the voltage of the auxiliary battery pack corresponding to the auxiliary management component with upper precedence.

Figure 4:
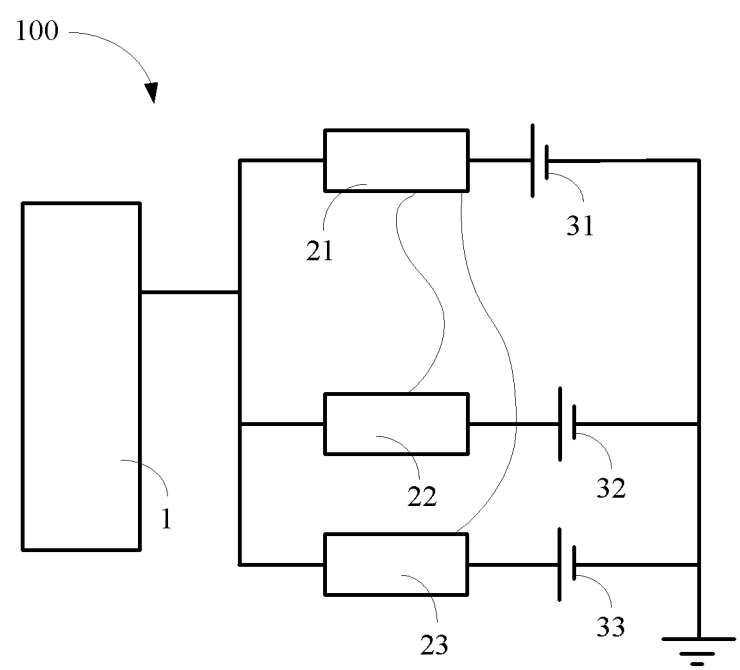
FIG. 4 is a schematic diagram of a charging circuit according to an exemplary embodiment.
Figure 5:
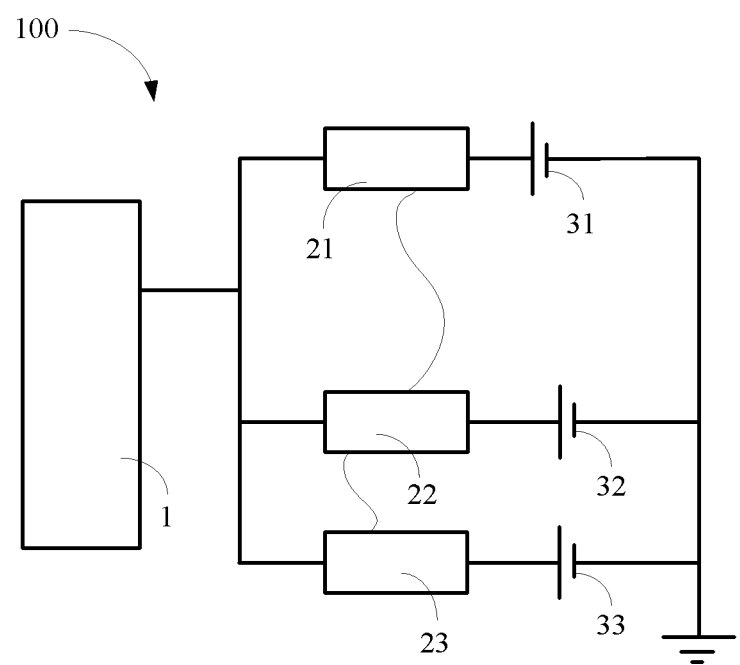
FIG. 5 is a schematic diagram of a charging circuit according to an exemplary embodiment.

FIG. 4 and FIG. 5 are schematic diagrams of the charging circuit 100 according to exemplary embodiments. As illustrated in FIG. 4, the plurality of charging management components 2 may include a first charging management component 21, a second charging management component 22, and a third charging management component 23. The plurality of battery packs 3 may include a first battery pack 31 connected in series with the first charging management component 21, a second battery pack 32 connected in series with the second charging management component 22, and a third battery pack 33 connected in series with the third charging management component 23. Any one of the first charging management component 21, the second charging management component 22, and the third charging management component 23 may be used as the main management component and the other charging management components may be used as the auxiliary management components.

For illustrative purposes, it is assumed that the first charging management component 21 is used as the main management component, the first battery pack 31 is used as the main battery pack, the second charging management component 22 and the third charging management component 23 are used as the auxiliary management components, and the second battery pack 32 and the third battery pack 33 are used as the auxiliary battery packs. The precedence of the second charging management component 22 may be higher than that of the third charging management component 23, and the second charging management component 22 and the third charging management component 23 may be respectively and electrically connected with the first charging management component 21.

When the voltage of each of the first battery pack 31, the second battery pack 32, and the third battery pack 33 is smaller than a first preset value, the first charging management component 21 may firstly pre-charge the first battery pack 31, and when the first battery pack 31 is switched to a constant-current charging stage, the first charging management component 21 may send a first charging instruction to the second charging management component 22 with the higher precedence, such that the second charging management component 22 may pre-charge the second battery pack 32 according to the first charging instruction. With the advancement of the charging process, the main management component 21 may send a second charging instruction to the second charging management component 22 and send a first charging instruction to the third charging management component 23 when the first battery pack 31 is switched to a constant-voltage charging stage, such that the second charging management component 22 may charge the second battery pack 32 with a constant current and the third charging management component 23 may pre-charge the third battery pack 22.

As inferred in turn, the first battery pack 31, the second battery pack 32, and the third battery pack 33 may sequentially enter a charging termination stage and sequentially complete the charging. After the first battery pack 31 firstly completes the charging, the first charging management component 21 may stop outputting current to the first battery pack 31. Similarly, after the second battery pack 32 completes the charging, the second charging management component 22 may stop outputting current to the second battery pack 32.

The first preset value may be 3V. When the voltages of the first battery pack 31, the second battery pack 32 and the third battery pack 33 are all lower than 3V, it indicates that the remaining power of the first battery pack 31, the second battery pack 32, and the third battery pack 33 is low, so the time periods of the maximum charging current of the first battery pack 31, the second battery pack 32, and the third battery pack 33 can be staggered by charging the first battery pack 31 and then charging the second battery pack 32 and finally charging the third battery pack 33, thus reducing the heating.

In addition to, as described in the previous embodiment, the mode of sending a charging instruction to each auxiliary management component through the main management component to indicate the charging process of the corresponding auxiliary management component, in another embodiment, as illustrated in FIG. 5, the plurality of charging management components may include a main management component and a plurality of auxiliary management components arranged according to precedence. The main management component may be electrically connected with the auxiliary management component with the highest precedence. The plurality of auxiliary management components may be sequentially and electrically connected according to the precedence. The auxiliary management component with upper precedence may send a third charging instruction to the auxiliary management component with next lower precedence according to the voltage of the auxiliary battery pack connected with the auxiliary management component with upper precedence.

For example, still as illustrated in FIG. 5, the plurality of charging management components 2 may include a first charging management component 21, a second charging management component 22, and a third charging management component 23. The plurality of battery packs 3 may include a first battery pack 31 connected in series with a first charging management component 21, a second battery pack 32 connected in series with a second charging management component 22, and a third battery pack 33 connected in series with a third charging management component 23. Any one of the first charging management component 21, the second charging management component 22, and the third charging management component 23 may be used as the main management component, and the other charging management components may be used as the auxiliary management components.

It is assumed that the first charging management component 21 is used as the main management component, the first battery pack 31 is used as the main battery pack, the second charging management component 22 and the third charging management component 23 are used as the auxiliary management components, and the second battery pack 32 and the third battery pack 33 are used as the auxiliary battery packs. The precedence of the second charging management component 22 may be higher than that of the third charging management component 23. The first charging management component 21 may be electrically connected with the second charging management component 22, and the second charging management component 22 may be electrically connected with the third charging management component 23.

Assuming that the charging starts from the moment when the voltages of the first battery pack 31, the second battery pack 32, and the third battery pack 33 are all lower than a first preset value, the first charging management component 21 may firstly pre-charge the first battery pack 31, and when the first battery pack 31 is switched to a constant-current charging stage, the first charging management component 21 may send a first charging instruction to the second charging management component 22 with the higher precedence, such that the second charging management component 22 may pre-charge the second battery pack 32 according to the first charging instruction. With the advancement of the charging process, the main management component 21 may send a second charging instruction to the second charging management component 22 when the first battery pack 31 is switched to a constant-voltage charging stage, such that the second charging management component 22 may charge the second battery pack 32 with a constant current, and the second charging management component 22 may send a third charging instruction to the third charging management component 23, such that the third charging management component 23 may pre-charge the third battery pack 33.

In the embodiment illustrated in FIG. 5, by acquiring the voltage of the auxiliary battery pack connected with the auxiliary management component with the highest precedence through the main management component, the charging current of the auxiliary battery pack may be adjusted. Further, the auxiliary management component with the higher precedence may acquire the voltage of the auxiliary battery pack connected with the auxiliary management component with the lower precedence, so as to adjust the charging current of the auxiliary battery pack connected with the auxiliary management component with the lower precedence through the auxiliary management component with the higher precedence, thus reducing the occupied resources of the main management component and reducing the production cost.

In the embodiments illustrated in FIG. 4 and FIG. 5, description is made by taking that the charging circuit 100 includes one main management component and two auxiliary management components as an example. In other embodiments, the charging circuit 100 may include three or more than three auxiliary management components, which are not limited in the disclosure.

It is to be noted that, in the embodiments illustrated in FIG. 2 to FIG. 5, description is made by taking that the voltage of the second battery pack 32 has reached a threshold for constant-current charging when the first charging management component 21 charges the first battery pack at a constant voltage as an example. In other embodiments, if the voltage of the second battery pack 32 does not reach the threshold for constant-current charging when the first charging management component 21 charges the first battery pack 31 with a constant voltage, the second charging management component 22 may continue pre-charging the second battery pack 32, and when the voltage of the second battery pack 32 reaches the threshold for constant-current charging, the first charging management component 31 may again send the second charging instruction to the second charging management component.

In the embodiments illustrated in FIG. 2 and FIG. 3, the charging process is described by taking that the remaining power of the first battery pack 31 and the second battery pack 32 is low as an example. In an embodiment, a user may charge the first battery pack 31 and the second battery pack 32 when the remaining power of the first battery pack 31 and the second battery pack 32 is at a medium level. In this case, the first charging management component 21 may also determine the charging current of the first battery pack 31 according to the voltage of the first battery pack 31, and send a charging instruction to the second charging management component 22 when the first battery pack 31 enters a next charging stage, such that the second charging management component 22 may charge the second battery pack 32.

Similarly, in the embodiments illustrated in FIG. 4 and FIG. 5, the charging process is described by taking that the remaining power of the first battery pack 31, the second battery pack 32, and the third battery pack 33 is low as an example. In an embodiment, a user may also charge the first battery pack 31, the second battery pack 32, and the third battery pack 33 when the remaining power of the first battery pack 31 and the second battery pack 32 is at a medium level. In this case, the first charging management component 21 may also determine the charging current of the first battery pack 31 according to the voltage of the first battery pack 31, and send a charging instruction to the second charging management component 22 when the first battery pack 31 enters a next charging stage. Further, when the second battery pack 32 enters a next charging stage, the main management component or the auxiliary management component with higher precedence may send a charging instruction to the auxiliary management component with lower precedence, so as to instruct the auxiliary management component with the lower precedence to charge the connected auxiliary battery pack.

In the above embodiments, generally speaking, a user may connect the interface 1 of the charging circuit 100 with an external charging end when the electronic device provided with the charging circuit 100 is in a powered-on state. Thus, in this state, one or more batteries of the plurality of battery packs need to supply power to the electronic device. Therefore, the electronic device may be supplied with power through the battery pack connected with the main management component when the interface 1 is connected with the external charging end, and the battery pack connected with the auxiliary management component may be switched to a power supply state after the charging of the battery pack connected with the main management component is completed, thus avoiding the situation that the power of the fully charged battery pack is consumed and ensuring that the charging circuit 100 can fully charge the plurality of battery packs in the powered-on state.

In an embodiment, when the charging circuit 100 includes one main management component and one auxiliary management component, the main battery pack may supply power to the electronic device first, and then the auxiliary battery pack may supply power to the electronic device after the charging of the main battery pack is completed. Still as illustrated in FIG. 2 and FIG. 3, assuming that the first charging management component 21 is the main management component and the second charging management component 22 is the auxiliary management component, the first battery pack 31 may supply power to the electronic device, and then the second battery pack 32 may supply power to the electronic device.

In another embodiment, when the charging circuit 100 includes one main management component and a plurality of auxiliary management components arranged according to precedence, after the charging of the battery pack connected with the main management component is completed, at least one battery pack for power supply may be determined according to the precedence of the auxiliary management components, and when the charging of the battery pack corresponding to the auxiliary management component with present precedence is completed, the at least one battery pack may be replaced with a battery pack corresponding to the auxiliary management component with next lower precedence for power supply.

For example, as illustrated in FIG. 4 and FIG. 5, it is assumed that the first charging management component 21 is used as the main management component, the first battery pack 31 is used as the main battery pack, the second charging management component 22 and the third charging management component 23 are used as the auxiliary management components, and the second battery pack 32 and the third battery pack 33 are used as the auxiliary battery packs. The precedence of the second charging management component 22 may be higher than that of the third charging management component 23. Thus, firstly the first battery pack 31 may supply power to the electronic device, then the second battery pack 32 may supply power to the electronic device, and finally the third battery pack 33 may supply power to the electronic device.

In the above embodiments, when the charging of the battery packs connected with the main management component and the auxiliary management components is completed, the plurality of battery packs may jointly supply power, such that the power consumption of each battery pack may be basically the same, avoiding a large difference in the remaining power between the battery packs, and facilitating the subsequent control of the charging process.

In some embodiments, with the increase of the service life of the electronic device, each battery pack may have different loss, for example, the reduction in battery capacity, and battery charging and discharging efficiency. Therefore, acquisition of the aging condition of each battery pack may be conducive to the battery self-inspection performed by the electronic device and the appropriate setting of a charging plan. In the embodiments, since each battery pack and other battery packs are charged asynchronously, any charging management component can obtain the time required for each battery pack to complete a charging cycle, determine the aging state of each battery pack, and improve the charging and discharging safety performance.

Figure 6:
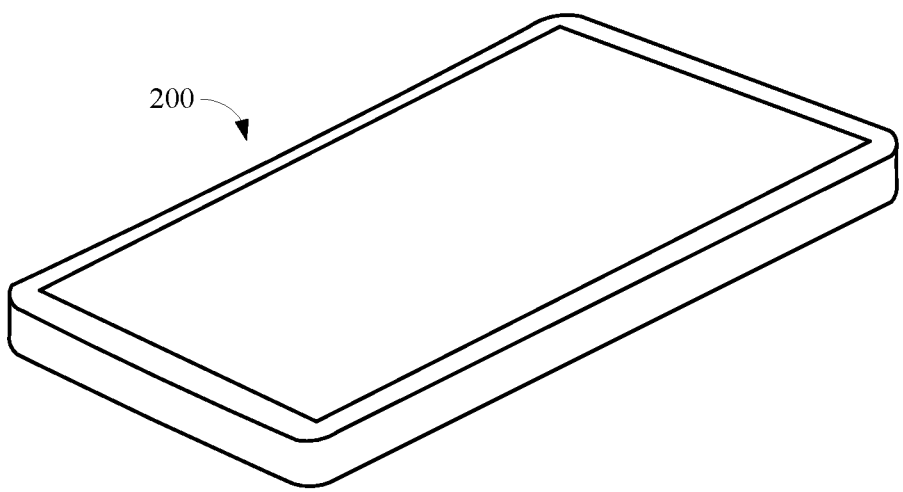
FIG. 6 is a schematic diagram of an electronic device according to an exemplary embodiment.

Based on the above embodiments, the present disclosure further provides an electronic device 200 as illustrated in FIG. 6, which may include the charging circuit 100 as described in any one of the above embodiments. The electronic device 200 may be an intelligent device such as a mobile phone terminal or a tablet computer terminal.

Other embodiments of the disclosure will be apparent to those skilled in the art from consideration of the description and practice of the disclosure disclosed here. This application is intended to cover any variations, uses, or adaptations of the disclosure following the general principles thereof and including such departures from the disclosure as come within known or customary practice in the art. It is intended that the description and embodiments be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A charging circuit, comprising:
an interface;
a plurality of charging management components connected to the interface in parallel; and
a plurality of battery packs, wherein each of the plurality of battery packs comprises a battery or a plurality of batteries connected in series with each other, the plurality of battery packs are connected in series with the plurality of charging management components, respectively, and the plurality of battery packs are connected in parallel,
wherein the plurality of charging management components are electrically connected with each other to adjust, through signal interaction between the plurality of charging management components, a charging current that is input to each of the battery packs, such that a time period of a maximum charging current for each of the plurality of battery packs is different from a time period of a maximum charging current for another one of the plurality of battery packs, wherein the plurality of charging management components comprise a main management component and an auxiliary management component, and the main management component is electrically connected to the auxiliary management component;

the plurality of battery packs comprise a main battery pack connected in series with the main management component, and an auxiliary battery pack connected with the auxiliary management component; and the main management component is configured to adjust, according to voltages of the main battery pack and the auxiliary battery pack, a charging current that is input to the main battery pack, and send a charging instruction to the auxiliary management component, wherein the charging instruction is configured to adjust a charging current output from the auxiliary management component to the auxiliary battery pack.

2. The charging circuit according to claim 1, wherein when the voltages of the main battery pack and the auxiliary battery pack are both smaller than a first preset value, the main management component is configured to pre-charge the main battery pack and send, when the main battery pack is switched to a constant-current charging stage, a first charging instruction to the auxiliary management component, wherein the first charging instruction is configured to instruct the auxiliary management component to pre-charge the auxiliary battery pack.

3. The charging circuit according to claim 1, wherein the main management component is configured to send a second charging instruction to the auxiliary management component after the main battery pack is switched to a constant-voltage charging stage, wherein the second charging instruction is configured to instruct the auxiliary management component to charge the auxiliary battery pack with a constant current.

4. The charging circuit according to claim 1, wherein the plurality of charging management components comprise a plurality of auxiliary management components arranged according to precedence; and the main management component is connected to each of the plurality of auxiliary management components, and the main management component is configured to send, according to a voltage of an auxiliary battery pack corresponding to an auxiliary management component with upper precedence, the charging instruction to the auxiliary management component with next lower precedence.

5. The charging circuit according to claim 1, wherein the plurality of charging management components comprise a plurality of auxiliary management components arranged according to precedence, the main management component is electrically connected with an auxiliary management component with highest precedence, and the plurality of auxiliary management components are sequentially and electrically connected according to the precedence, wherein an auxiliary management component with upper precedence is configured to send a third charging instruction to an auxiliary management component with next lower precedence according to a voltage of an auxiliary battery pack connected with the auxiliary management component with upper precedence.

6. The charging circuit according to claim 1, wherein when an electronic device provided with the charging circuit is in a powered-on state and the interface is connected with an external charging end, the main battery pack connected with the main management component is switched to a power supply state, and after charging of the main battery pack connected with the main management component is completed, the auxiliary battery pack connected with the auxiliary management component is switched to a power supply state.

7. The charging circuit according to claim 6, wherein when the charging of the main battery pack connected with the main management component and charging of the auxiliary battery pack connected with the auxiliary management component are completed, the plurality of battery packs jointly supply power.

8. The charging circuit according to claim 6, wherein the plurality of charging management components comprise a plurality of auxiliary management components arranged according to precedence, wherein after the charging of the main battery pack connected with the main management component is completed, at least one battery pack is determined sequentially for power supply according to the precedence, and when charging of the auxiliary battery pack corresponding to the auxiliary management component with present precedence is completed, the at least one battery pack is replaced with a battery pack corresponding to an auxiliary management component with next lower precedence for power supply.

9. The charging circuit according to claim 1, wherein the plurality of charging management components comprise a first charging management component and a second charging management component, the plurality of battery packs comprise a first battery pack and a second battery pack, and the first battery pack and the second battery pack are connected in parallel;

the first charging management component is connected in series with the first battery pack, and the second charging management component is connected in series with the second battery pack.

10. The charging circuit according to claim 1, wherein a charging management component of the plurality of charging management components determines an aging state of each of the plurality of battery packs according to a duration for completing one charging cycle by each battery pack.

11. An electronic device, comprising a charging circuit, the charging circuit comprising:

an interface;

a plurality of charging management components connected to the interface in parallel; and a plurality of battery packs, wherein each of the plurality of battery packs comprises a battery or a plurality of batteries connected in series with each other, the plurality of battery packs are connected in series with the plurality of charging management components, respectively, and the plurality of battery packs are connected in parallel, wherein the plurality of charging management components are electrically connected with each other to adjust, through signal interaction between the plurality of charging management components, a charging current that is input to each of the battery packs, such that a time period of a maximum charging current for each of the plurality of battery packs is different from a time period of a maximum charging current for another one of the plurality of battery packs, wherein the plurality of charging management components comprise a main management component and an auxiliary management component, and the main management component is electrically connected to the auxiliary management component;

the plurality of battery packs comprise a main battery pack connected in series with the main management component, and an auxiliary battery pack connected with the auxiliary management component; and the main management component is configured to adjust, according to voltages of the main battery pack and the auxiliary battery pack, a charging current that is input to the main battery pack, and send a charging instruction to the auxiliary management component, wherein the charging instruction is configured to adjust a charging current output from the auxiliary management component to the auxiliary battery pack.

12. The electronic device according to claim 11, wherein when the voltages of the main battery pack and the auxiliary battery pack are both smaller than a first preset value, the main management component is configured to pre-charge the main battery pack and send, when the main battery pack is switched to a constant-current charging stage, a first charging instruction to the auxiliary management component, wherein the first charging instruction is configured to instruct the auxiliary management component to pre-charge the auxiliary battery pack.

13. The electronic device according to claim 11, wherein the main management component is configured to send a second charging instruction to the auxiliary management component after the main battery pack is switched to a constant-voltage charging stage, wherein the second charging instruction is configured to instruct the auxiliary management component to charge the auxiliary battery pack with a constant current.

14. The electronic device according to claim 11, wherein the plurality of charging management components comprise a plurality of auxiliary management components arranged according to precedence; and the main management component is connected to each of the plurality of auxiliary management components, and the main management component is configured to send, according to a voltage of an auxiliary battery pack corresponding to an auxiliary management component with upper precedence, the charging instruction to the auxiliary management component with next lower precedence.

15. The electronic device according to claim 11, wherein the plurality of charging management components comprise a plurality of auxiliary management components arranged according to precedence, the main management component is electrically connected with an auxiliary management component with highest precedence, and the plurality of auxiliary management components are sequentially and electrically connected according to the precedence, wherein an auxiliary management component with upper precedence is configured to send a third charging instruction to an auxiliary management component with next lower precedence according to a voltage of an auxiliary battery pack connected with the auxiliary management component with upper precedence.

16. The electronic device according to claim 11, wherein when the electronic device is in a powered-on state and the interface is connected with an external charging end, the main battery pack connected with the main management component is switched to a power supply state, and after charging of the main battery pack connected with the main management component is completed, the auxiliary battery pack connected with the auxiliary management component is switched to a power supply state.

17. The electronic device according to claim 16, wherein when the charging of the main battery pack connected with the main management component and charging of the auxiliary battery pack connected with the auxiliary management component are completed, the plurality of battery packs jointly supply power.

18. The electronic device according to claim 16, wherein the plurality of charging management components comprise a plurality of auxiliary management components arranged according to precedence, wherein after the charging of the main battery pack connected with the main management component is completed, at least one battery pack is determined sequentially for power supply according to the precedence, and when charging of the auxiliary battery pack corresponding to the auxiliary management component with present precedence is completed, the at least one battery pack is replaced with a battery pack corresponding to an auxiliary management component with next lower precedence for power supply.

* * * * *